US012523694B2

(12) United States Patent
Kumar et al.

(10) Patent No.: US 12,523,694 B2
(45) Date of Patent: Jan. 13, 2026

(54) POWER DEVICE THRESHOLD VOLTAGE MEASUREMENT CIRCUIT AND OPERATION METHOD THEREOF

(71) Applicant: National Yang Ming Chiao Tung University, Hsinchu (TW)

(72) Inventors: Rustam Kumar, Patna (IN); Tian-Li Wu, Taoyuan (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 384 days.

(21) Appl. No.: 18/235,267

(22) Filed: Aug. 17, 2023

(65) Prior Publication Data

US 2025/0060403 A1  Feb. 20, 2025

(51) Int. Cl.
*G01R 31/12* (2020.01)
*G01R 19/00* (2006.01)
*G01R 31/26* (2020.01)

(52) U.S. Cl.
CPC ....... *G01R 31/129* (2013.01); *G01R 31/2623* (2013.01); *G01R 19/0038* (2013.01)

(58) Field of Classification Search
CPC .............. G01R 31/129; G01R 31/2623; G01R 19/0038
(Continued)

(56) References Cited

U.S. PATENT DOCUMENTS 7,545,161 B2  6/2009  Hsu et al.
9,310,408 B2  4/2016  Mikata et al.
(Continued)

FOREIGN PATENT DOCUMENTS

CN   116413568 A    7/2023
EP   4 209 791 A1   7/2023
(Continued)

OTHER PUBLICATIONS

Sharma et al. ("Characterisation of the Junction Temperature of Gallium-Nitride Power Devices via Quasi-Threshold Voltage as Temperature Sensitive Electrical Parameter"; Pub Dec. 2020; The 10th International Conference on Power Electronics, Machines and Drives; Online Conference; pp. 1-5) (Year: 2020).*

(Continued)

*Primary Examiner* — Alesa Allgood
*Assistant Examiner* — Rahul Maini
(74) *Attorney, Agent, or Firm* — Birch, Stewart, Kolasch & Birch, LLP

(57) ABSTRACT

A power device threshold voltage measurement circuit and its operation method thereof are provided. The measurement circuit includes a switch component, a device under test, a common source capacitor and a decoupling capacitor. The switch component and the device under test forms a half bridge circuit and the common source capacitor is in series connected at the source of the device under test. The device under test is connected as a lower switch of the half bridge circuit and the decoupling capacitor is connected between the device under test and the common source capacitor. By applying an OFF-state stress mode and a measurement mode successively afterwards, a threshold voltage of the device under test is obtained. And the present invention is beneficial to achieving in shorter pulse width, faster measuring speed and inexpensive measuring equipment, and can thus be widely applied to group III-N based power devices.

20 Claims, 6 Drawing Sheets

(58) Field of Classification Search
USPC .............. 324/725, 762.01, 762.08, 762.09
See application file for complete search history.

(56) References Cited

U.S. PATENT DOCUMENTS

| | | | |
|---|---|---|---|
| 2005/0248360 A1* | 11/2005 | Patel | G01R 31/40 324/762.09 |
| 2019/0072588 A1* | 3/2019 | Chen | G01R 19/155 |
| 2020/0049742 A1 | 2/2020 | Sato | |
| 2023/0221363 A1 | 7/2023 | Rudiak et al. | |

FOREIGN PATENT DOCUMENTS

| | | |
|---|---|---|
| TW | I832378 B | 8/2018 |
| TW | I640784 B | 11/2018 |

OTHER PUBLICATIONS

Efthymiou et al., "Understanding the Threshold Voltage Instability During Off-State Stress in p-GaN HEMTs", IEEE Electron Device Letters, vol. 40, No. 8, Aug. 2019, pp. 1253-1256.

Keysight Technology. B1505A power device analyzer/curve tracer. (May 2022) [Online] Available: https://www.keysight.com/in/en/assets/7018-02115/data-sheets/5990-3853.pdf, total of 45 pages.

Kumar et al., "Threshold Voltage Instability Measurement Circuit for Power GaN HEMTs Devices", IEEE Transactions on Power Electronics, vol. 38, No. 6, Jun. 2023, pp. 6891-6896.

Yang et al., "Characterization of Threshold Voltage Instability Under Off-State Drain Stress and Its Impact on p-GaN HEMT Performance", IEEE Journal of Emerging and Selected Topics in Power Electronics, vol. 9, No. 4, Aug. 2021, pp. 4026-4035.

* cited by examiner

POWER DEVICE THRESHOLD VOLTAGE MEASUREMENT CIRCUIT AND OPERATION METHOD THEREOF

BACKGROUND OF THE INVENTION

Field of the Invention

The present disclosure is related to a scheme diagram of threshold voltage instability measurement circuit. And more particularly, the present invention is related to a measurement circuit and its operation method thereof to characterize the threshold voltage instability for Group III-N based power devices, in which the objectives of a shorter pulse width, faster measurement time and less costly measuring equipment can be accomplished by employing the present invention.

Description of the Prior Art

As known, Gallium Nitride (GaN) based power devices have become key components of power electronics' circuits because of their low on-resistance ($R_{ds,\ on}$) and fast switching speed in recent years. These features are achieved due to Aluminum Gallium Nitirde/GaN heterojunction inside the device, which creates two-dimensional electron gas (2-DEG) layer, and this 2-DEG offers lower low on-resistance $R_{ds,\ on}$. In addition, it is also known that the GaN has a large bandgap compared with Silicon (Si). And due to such material property, it allows the GaN to sustain a high critical electrical field and causes the device to be able to shrink for the same breakdown voltage. It is believed that such shirk in device size is beneficial to offer low junction capacitance, which results in a much faster switching speed of the device.

These GaN-based power devices are normally-ON devices. However, for safety purposes, it is known that a power electronics circuit usually prefers a normally-OFF device. As a result, there have been several methodologies, so far, to be explored to achieve these normally-OFF devices, such as producing recessed gate, implanted gate, cascade structure, and/or p-GaN gate. Among these provided methods, the p-GaN gate is widely used in commercial devices. And yet, it draws our attention that this type of device still suffers from certain drawbacks, such as the threshold voltage ($V_{th}$) instability. And such instability issues in GaN high-electron mobility transistors (HEMTs) are mainly caused by the trapping effects under different operation conditions. Some recent literature also indicates that the OFF-state $V_{th}$ instability is most probably occurred due to the hole deficiency in the floating p-GaN layer.

Until nowadays, these have been few circuits to be developed so as to measure the threshold voltage ($V_{th}$). As known, a conventional typical curve tracer is used to measure the threshold voltage ($V_{th}$). However, such curve tracer is only able to apply a minimum of 500 micro seconds (μs) pulse during the OFF-state. And this time duration is too large for the actual switching frequency of the device. In addition, the curve tracer with N1265A is able to reduce the minimum pulse width to 20 μs. And yet, the setup is still unable to measure the threshold voltage ($V_{th}$), if the device is switching lesser than 20 μs. Also, such setup requires an expensive interface for the connection and packaging measurement, and the overall setup will become relatively too high to afford. In order to reduce the cost, a characterization circuit may be used as well. Such characterization circuit uses a half-bridge circuit to achieve the minimum duration of the OFF-state pulse and a current source for the $V_{th}$ measurement. The current source is connected to the device under test (DUT) in such a way that when the OFF-state pulse is removed, then the current source injects a specified current through the drain of the device under test (DUT) by making the drain voltage the same as the gate voltage. However, it is still worthy of noticing that such circuit is only able to measure the threshold voltage ($V_{th}$) shift due to the OFF-state stress voltage. And in addition, the current source and its additional diodes accompanying used in this circuit also make the overall circuit more expensive than ever.

As a result, based on the foregoing drawbacks and necessary suppression and elimination of the conventional issues are thus to be expected, it, in view of all, should be apparent and obvious that there is indeed an urgent need for the professionals in the field for a novel and inventive circuit structure diagram to be developed, so as to solve the above-mentioned issues occurring in the prior arts. By adopting the disclosed technical solution of the present invention, a circuit that is able to measure the threshold voltage ($V_{th}$) shift due to the OFF-state stress and switching transient current is provided, and the aforementioned issues existing in the prior arts are to be addressed. In particular, please proceed to find a complete and full detailed specific descriptions and implementations, which are now to be provided by Applicants of the present invention in the following paragraphs as below for your references.

SUMMARY OF THE INVENTION

In order to overcome the above-mentioned disadvantages, one major objective in accordance with the present invention is provided for a novel and creative circuit scheme for threshold voltage instability measurement.

According to the present invention, a half-bridge circuit with a series-connected common source capacitor is proposed. And the half-bridge circuit is designed to allow for achieving shorter pulse width, whereas the series-connected common source capacitor is designed to provide transient current. By employing these two technical features of the disclosed circuit diagram, it is believed that an EPC2014C device can be characterized, and the instability in threshold voltage will be reported in the present invention.

Another objective in accordance with the present invention is to provide a novel threshold voltage measurement circuit for a power device, in which the power device is a device fabricated in using Group III-N based semiconductor materials. The purposed measurement circuit is aimed to characterize the threshold voltage instability for Group III-N based devices, including for instance, GaN, AlN, AlGaN devices, and so on. As compared to the prior arts, the present invention ensures to offer a low-cost circuit diagram which is capable of measuring the $V_{th}$ shift due to not only OFF-state stress but also switching transient current for group III-N based devices in high-frequency applications.

And yet, one more another objective in accordance with the present invention is to provide an inventive power device threshold voltage measurement circuit and its operation method thereof as well. By employing the disclosed technical contents, it is verified that a much shorter pulse width which is less than 7.6 micro seconds (μs) during OFF-state can be achieved by employing the present invention. In such a way, it is believed that since the present invention is able to provide lesser than 7.6 μs pulse width during OFF-state, which represents the real operating switching frequency for group III-N based devices, the present invention can thus be practically applied to the semiconductor power devices industries nowadays, especially for group III-N based devices. In addition, the disclosed power device threshold voltage measurement circuit in the present invention is simpler in circuit diagram since it can simply be implemented using one power switch and one common source capacitor. As a result, it is apparent that the relative cost of the disclosed power device threshold voltage measurement circuit of the present invention can be significantly reduced, which accordingly will be able to accelerate the development of the group III-N based devices. By employing such circuit design figure, it is apparent that the circuit layout complexity of the present invention is able to be made lowered and easy to be in control.

Therefore, in the following descriptions, the Applicants will proceed to provide a plurality of embodiments and variations that will be discussed later in the following paragraphs in order to verify that the proposed power device threshold voltage measurement circuit and its operation method thereof, which are disclosed in the present invention are effective. Thereby, it is worthy of full attentions that the present invention achieves to successfully solves the problems of prior arts and meanwhile maintain superior electrical properties. As a result, it is believed that the proposed technical contents of the present invention are extremely advantageous of as being highly competitive and able to be widely utilized in related IC and semiconductor industries.

Therefore, in order to achieve the above-mentioned objectives, the present invention is aimed to provide a modified threshold voltage measurement circuit for a power device which will now be introduced as follows.

According to the present invention, a power device threshold voltage measurement circuit is firstly purposed. The power device threshold voltage measurement circuit includes a switch component, a device under test, a common source capacitor and a decoupling capacitor. The switch component includes a first terminal for receiving an input voltage, a second terminal for receiving a first driving in voltage, and a third terminal. The device under test includes a first terminal which is being electrically to the third terminal of the switch component, a second terminal for receiving a second driving voltage and a third terminal. The common source capacitor is electrically connected in series with the device under test, and the common source capacitor is electrically connected between the third terminal of the device under test and a ground. The decoupling capacitor is electrically connected in parallel with the device under test and the common source capacitor, and the decoupling capacitor is electrically connected between the first terminal of the device under test and the ground.

According to the embodiment of the present invention, the switch component is a power switch, and the second terminal of the power switch is further connected with a gate driver for receiving the first driving voltage such that the first driving voltage is a gate driving voltage of the power switch.

In addition, the device under test is a Group III-N based switching device, and the second terminal of the device under test can also be further connected with a gate driver for receiving the second driving voltage such that the second driving voltage is a gate driving voltage of the Group III-N based switching device.

According to the embodiment of the present invention, the power switch and the device under test forms a half-bridge (HB) circuit and the common source capacitor is serially connected to the source of the device under test. The device under test is connected as a lower switch of the half-bridge (HB) circuit. And the decoupling capacitor is electrically connected between the device under test and the common source capacitor.

According to the embodiment of the present invention, an OFF-state stress feature can be effectively achieved by using the above mentioned half-bridge circuit, wherein the device under test is connected as a lower switch. And, the common source capacitor is connected in series with the half-bridge circuit to achieve a transient switching current.

Moreover, regarding the operation method of such circuit scheme, the present invention, in another aspect, also provides an operation method for a power device threshold voltage measurement circuit, wherein the power device threshold voltage measurement circuit includes a switch component, a device under test, a common source capacitor and a decoupling capacitor. The switch component includes a first terminal for receiving an input voltage, a second terminal for receiving a first driving voltage and a third terminal. The device under test includes a first terminal which is being electrically to the third terminal of the switch component, a second terminal for receiving a second driving voltage and a third terminal. The common source capacitor is electrically connected in series with the device under test and electrically connected between the third terminal of the device under test and a ground. And the decoupling capacitor is electrically connected in parallel with the device under test and the common source capacitor and electrically connected between the first terminal of the device under test and the ground. According to the present invention, the operation method of the power device threshold voltage measurement circuit includes the following steps:

1. applying an OFF-state stress mode, in which a high-level voltage is provided across the second terminal and the third terminal of the switch component, and the second driving voltage provided to the device under test is zero; and
2. applying a measurement mode which is successively after the OFF-state stress mode, wherein in the measurement mode, a high-level voltage is provided both across the second terminal and the third terminal of the switch component and to the second driving voltage for inputting to the device under test, in order to measure a threshold voltage of the device under test.

According to one preferred embodiment of the present invention, before the OFF-state stress mode, the switch component and the device under test are kept off by applying a zero voltage across the second terminal and the third terminal of the switch component. And also, the zero voltage is applied across the second terminal and the third terminal of the device under test so as to keep the device under test in an off state before the OFF-state stress mode.

And then, when in the OFF-state stress mode, in which the high-level voltage is provided across the second terminal and the third terminal of the switch component, and the second driving voltage provided to the device under test is zero, it is observed that a current flowing through the device under test ($I_{dsat}$) is zero.

And next, when in the measurement mode, in which the high-level voltage is provided both across the second terminal and the third terminal of the switch component and to the second driving voltage for inputting to the device under test, it is observed that the current flowing through the device under test ($I_{dsat}$) will be generated. And as the current flowing through the device under test ($I_{dsat}$) is generated, a voltage across the third terminal of the device under test and the ground is increased, which results in a voltage across the second terminal and the third terminal of the device under test to be reduced such that the current flowing through the device under test ($I_{dsat}$) will be gradually decreased. As a result, when the current flowing through the device under test ($I_{dsat}$) reaches a threshold current ($I_{th}$), the present invention obtains that, the voltage across the second terminal and the third terminal of the device under test can be determined as the threshold voltage of the device under test.

And yet, according to the embodiment of the present invention, it is also feasible that a differential amplifier can be further electrically connected between the second terminal and the third terminal of the device under test so as to measure the voltage across the second terminal and the third terminal of the device under test as the threshold voltage of the device under test.

As a result, to sum up, it should be noted that according to the foregoing disclosed technical contents provided by the Applicant, the present invention is certainly not limited thereto by the above-mentioned embodiments. In other words, for people who are skilled in the art and having ordinary understandings and technical backgrounds to the present invention, it would be allowed for them to make various modifications or changes depending on different circuit regulations and/or specifications without departing from the scope of the invention. That is to say, the present invention is certainly not limited thereto. And the variant embodiments and/or circuit implementations should still fall into the claim scope of the present invention.

In general, those skilled in the art and having general knowledge are able to make appropriate modifications or variations with respective to the technical contents disclosed in the present invention without departing from the spirits of the present invention. The present invention is not restricted by the certain limited configurations and/or circuit diagrams disclosed in the embodiments of the present invention. As such, it is believed that the modifications or variations should still fall into the scope of the present invention, and the present invention covers the modifications and its equality.

As a result, based on the disclosed technical features illustrated as above, it is evident that the present invention is sophisticatedly designed and indeed discloses a novel modified scheme for a power device threshold voltage measurement circuit to be developed with both faster measuring speed and less expensive circuit cost. By adopting the present invention, it is believed that the present invention achieves in effectively eliminating the conventional drawback issues occurring in the prior arts. In addition, the circuit complexity for implementing such the disclosed power device threshold voltage measurement circuit can also be made to be relatively low.

As a result, it is believed that the proposed power device threshold voltage measurement circuit and its operation method thereof disclosed by the present invention, are beneficial in view of a great number of merits. Thus, it is believed that the present invention is extremely advantageous while compared to the prior arts.

These and other objectives of the present invention will become obvious to those of ordinary skill in the art after reading the following detailed description of preferred embodiments. And it is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
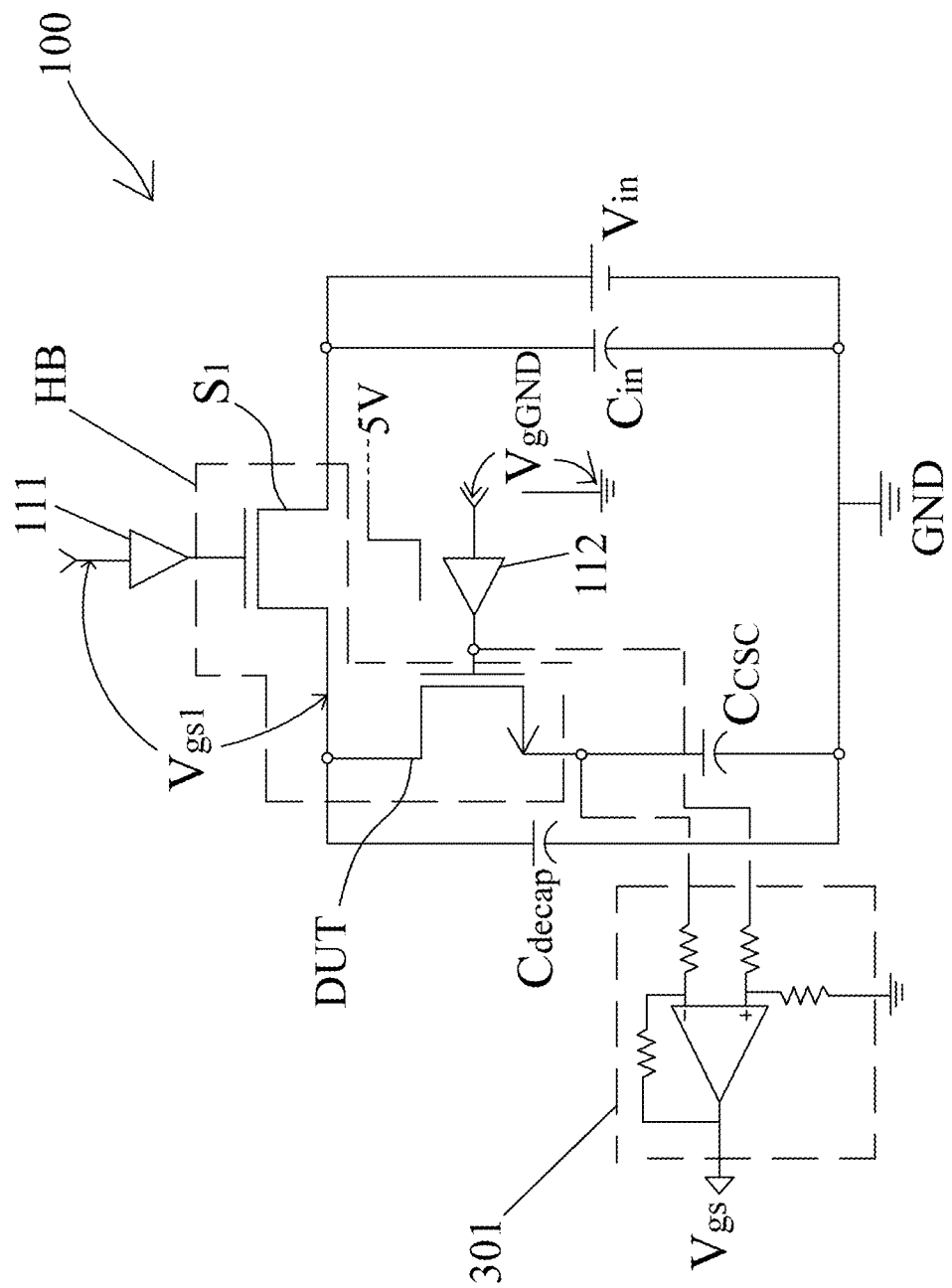
FIG. 1 schematically shows a circuit diagram of a proposed power device threshold voltage measurement circuit in accordance with one embodiment of the present invention.

Reference will now be made in detail to the preferred embodiments of the present invention, examples of which are illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

The embodiments described below are illustrated to demonstrate the technical contents and characteristics of the present invention and to enable the persons skilled in the art to understand, make, and use the present invention. However, it shall be noticed that it is not intended to limit the scope of the present invention. Therefore, any equivalent modification or variation according to the spirit of the present invention is to be also included within the scope of the present invention.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

The terms "substantially," "around," "about" and "approximately" can refer to within 20% of a given value or range, and preferably within 10%. Besides, the quantities provided herein can be approximate ones and can be described with the aforementioned terms if are without being specified. When a quantity, density, or other parameters includes a specified range, preferable range or listed ideal values, their values can be viewed as any number within the given range.

As the Applicants have described earlier in the Description of the Prior Art, since a conventional common curve tracer can only apply a minimum of 500 μs pulse for measuring the gate threshold voltage of group III-N based devices (GaN, AlN, and AlGaN), and even though an N1265A curve tracer is able to reduce the minimum pulse width to 20 μs, the accompanying setup is still incapable of measuring the gate threshold voltage if a switching time of the device is shorter than 20 μs. Apart from these restrictions, it is also noticeable that an expensive interface for the connection and packaging measurement, as well as a relatively expensive setup are necessarily required in the prior arts. As a result, to address the aforementioned issues, the present invention is thus provided and aimed to solve such drawbacks by proposing a novel and inventive power device threshold voltage measurement circuit and its operation method thereof. Hereinafter in the present invention, the Applicants of the Application propose a circuit that is able to measure the gate threshold voltage ($V_{th}$) shift due to an OFF-state stress and switching transient current. The OFF-state stress feature is achieved using a half bridge circuit, whereas a device under test of the power device is connected as a lower switch. A common source capacitor is further connected in series with the half bridge circuit to achieve the transient switching current. For the gate threshold voltage ($V_{th}$) measurement, the purposed power device threshold voltage measurement circuit and its operation method thereof will now be provided and illustrated by the embodiment as described in the following sections for references.

At first, please refer to FIG. 1, which schematically shows a circuit diagram of a proposed power device threshold voltage measurement circuit in accordance with one embodiment of the present invention. According to the embodiment of the present invention, the proposed power device threshold voltage measurement circuit 100 comprises a switch component $S_1$, a device under test DUT, a common source capacitor $C_{CSC}$, and a decoupling capacitor $C_{decap}$. As illustrated in FIG. 1, the switch component $S_1$ is a three-terminal power switch component, which includes a first terminal, a second terminal and a third terminal. The first terminal of the switch component $S_1$ is configured for receiving an input voltage Vin, and the second terminal of the switch component $S_1$ is configured for receiving a first driving voltage. A gate driver 111 is further disposed and electrically connected with the second terminal of the power switch $S_1$ such that the first driving voltage is a gate driving voltage of the power switch $S_1$. The power switch $S_1$ is operable and adapted to be controlled by the gate driving voltage through its second terminal. In addition, an input capacitor $C_{in}$ is further disposed at the first terminal of the power switch $S_1$, such that the input capacitor $C_{in}$ is electrically connected between the first terminal of the power switch $S_1$ and a ground GND.

The third terminal of the switch component $S_1$ is electrically connected with the device under test DUT. According to the embodiment of the present invention, the device under test DUT is also a three-terminal component, which includes a first terminal, a second terminal and a third terminal. In the embodiment of the present invention, the device under test DUT can be preferably a power device of which is fabricated in using Group III-N based semiconductor materials. For instance, the device under test DUT can be and yet not limited to a Group III-N based GaN, AlN, or AlGaN switching power device. According to the embodiment of the present invention, the first terminal of the device under test DUT is a drain terminal of the power device, which is electrically connected to the third terminal of the switch component $S_1$. The second terminal of the device under test DUT is a gate terminal of the power device, which is configured for receiving a second driving voltage. As can be seen, a gate driver 112 is further disposed and electrically connected with the second terminal of the device under test DUT such that the second driving voltage is a gate driving voltage of the device under test DUT. By such configuration, the device under test DUT is operable and adapted to be controlled by the gate driving voltage through its second terminal. In addition, the third terminal of the device under test DUT is a source terminal of the power device, and the third terminal of the device under test DUT is electrically connected with the common source capacitor $C_{CSC}$ in series.

To be more specific, as can be seen in the FIG. 1 scheme, the switch component $S_1$ and the device under test DUT forms a half bridge circuit HB. And the common source capacitor $C_{CSC}$ is electrically connected in series with the device under test DUT of the half bridge circuit HB. In details, the device under test DUT is disposed and configured as a lower switch of the half bridge circuit HB, while the switch component $S_1$ is disposed and configured as an upper switch of the half bridge circuit HB. The common source capacitor $C_{CSC}$ is electrically connected between the third terminal of the device under test DUT and the ground GND.

The decoupling capacitor $C_{decap}$ is further electrically connected in parallel with the device under test DUT and the common source capacitor $C_{CSC}$, such that the decoupling capacitor $C_{decap}$ is electrically connected between the first terminal of the device under test DUT and the ground GND. In addition, a differential amplifier 301 may be alternatively and optionally as being electrically connected between the second terminal and the third terminal of the device under test DUT for measuring a voltage across the second terminal and the third terminal of the device under test DUT and providing as a gate to source voltage $V_{gs}$ of the device under test DUT.

Overall, when regarding the operation method of the disclosed power device threshold voltage measurement circuit, at the beginning of the measurement process, the upper switch (the switch component $S_1$) of the half bridge circuit HB provides an OFF-state stress. Next, the device under test DUT will be turned on to inject a current into the common source capacitor $C_{CSC}$ that causes a rise in the capacitor voltage leading to a decrease in the $V_{gs}$ voltage (the gate to source voltage $V_{gs}$ of the device under test DUT). And as the $V_{gs}$ voltage reaches below a threshold voltage $V_{th}$, the device under test DUT starts operating in the cutoff region. In general, the threshold voltage $V_{th}$ is decreased due to the de-trapping process generating inside the device under test DUT. And the aforementioned process will be repeated for different operating conditions so as to obtain a stable threshold voltage $V_{th}$.

Figure 2:
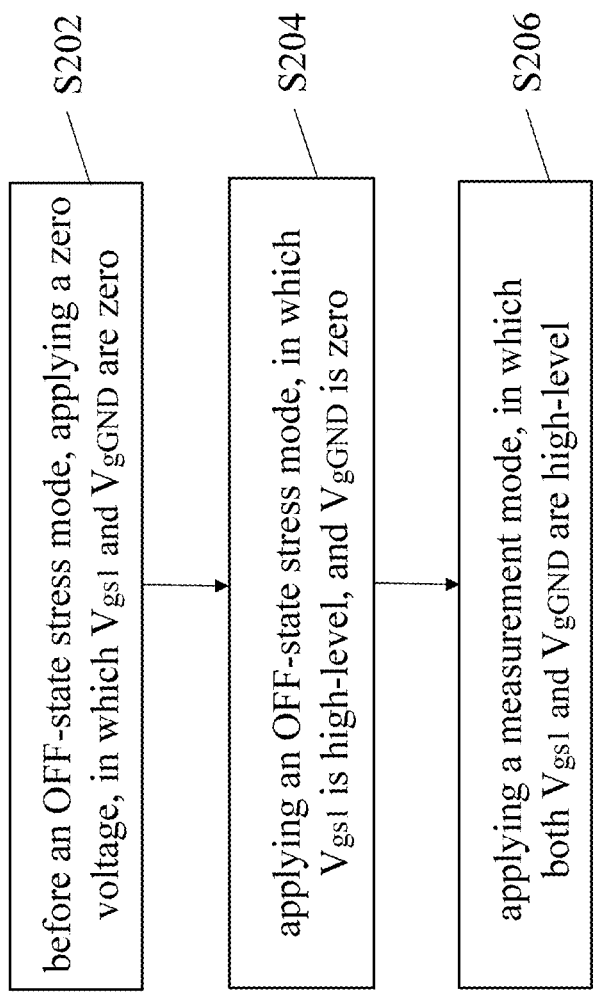
FIG. 2 schematically illustrates a flow chart of the proposed operation method of the power device threshold voltage measurement circuit in accordance with the embodiment of the present invention.

In the following sections, for a better understanding and more detailed descriptions, please refer to FIG. 2 of the present invention, which schematically illustrates a flow chart of the proposed operation method of the power device threshold voltage measurement circuit in accordance with the embodiment of the present invention. As can be seen in FIG. 2, the proposed operation method comprises a following steps of S202, S204 and S206. First, in the step of S202, which indicates the period before the OFF-state stress mode is applied, a zero voltage is firstly applied across the second terminal and the third terminal of the switch component $S_1$ such that the switch component $S_1$ is kept off by applying $V_{gs1}=0$. In addition, the device under test DUT is also kept off by applying a zero voltage across the second terminal and the third terminal of the device under test DUT, which means before the OFF-state stress mode is applied, the $V_{gGND}$ signal=0 as well. The corresponding waveforms of the $V_{gs1}$ signal as well as the $V_{gGND}$ signal are illustrated as in the interval $t_0 \sim t_s$ in FIG. 3. As can be seen, before starting the OFF-state stress mode $t_{stress}$, the switch component $S_1$ and the device under test DUT are kept off by applying zero voltage ($V_{gs1}=0$, and $V_{gGND}=0$) across their gate and source terminals in the time period of the interval $t_0 \sim t_s$. The purpose of such switching operation is to avoid any undesirable OFF-state stress from the beginning of this mode.

Next, in the step of S204, the OFF-state stress mode $t_{stress}$ is applied. Please also find accompanying waveform in FIG. 3, in which in the time interval $t_s \sim t_m$ which indicates the OFF-state stress mode $t_{stress}$ is begun, and in such a time interval of the OFF-state stress mode $t_{stress}$, the $V_{gs1}$ signal turns to be high-level, and the $V_{gGND}$ signal is kept at zero voltage. In this mode of operation, the $V_{gs1}$ signal becomes high till the $t_{stress}$ time, whereas the $V_{gGND}$ signal is kept low. Such operation mode allows OFF-stress voltage across the device under test DUT till the time interval $t_s \sim t_m$. FIG. 4 schematically shows an equivalent circuit diagram during the threshold voltage $V_{th}$ characterization process according to the embodiment of the present invention when in such an OFF-state stress mode $t_{stress}$ in between the time interval $t_s \sim t_m$. As can be seen in the OFF-state stress mode, the current $I_{dsat}$ flowing through the device under test DUT is zero, indicated by $I_{dsat}=0$. According to the embodiment of the present invention, it is apparent that in such an OFF-state stress mode $t_{stress}$ in between the time interval $t_s \sim t_m$, the switch component $S_1$ is active, while the device under test DUT is kept in an off state. In the drawing of FIG. 4, in order to provide a clear view and understanding of the above disclosed descriptions, the Applicants illustrate the active switch component $S_1$ with thicker lines.

And then, as shown in the step of S206, the measurement mode which is successively after the OFF-state stress mode will be applied. Please also find accompanying waveform in FIG. 3, in which after the indicated point of time $t_m$, which indicates that the measurement mode $t_{measurement}$ is begun, and in such a measurement mode $t_{measurement}$, both the $V_{gs1}$ signal and the $V_{gGND}$ signal are high-level. In this mode of operation, the $V_{gs1}$ signal and the $V_{gGND}$ signal are turned to be high till the whole $t_{measurement}$ time. Such the switching operation allows a current flowing through the common source capacitor $C_{CSC}$ and therefore causes a rise in the common source capacitor voltage ($V_{sGND}$).

Figure 5:
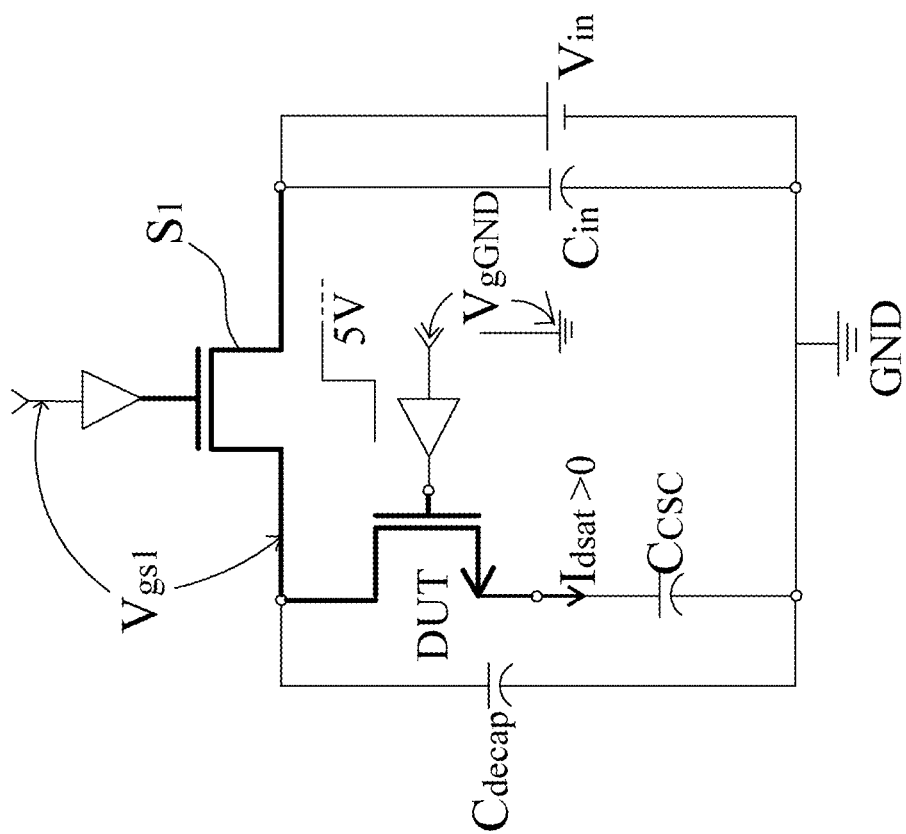
FIG. 5 schematically shows an equivalent circuit diagram during the threshold voltage $V_{th}$ characterization process according to the embodiment of the present invention when in a measurement mode $t_{measurement}$ after $t_m$.

Please refer to FIG. 5, which schematically shows an equivalent circuit diagram during the threshold voltage $V_{th}$ characterization process according to the embodiment of the present invention when in such a measurement mode $t_{measurement}$ after $t_m$. As can be seen in the measurement mode $t_{measurement}$, the current $I_{dsat}$ flowing through the device under test DUT at this point of time, will be generated, indicated by $I_{dsat}>0$. And according to the embodiment of the present invention, it is apparent that in such a measurement mode $t_{measurement}$ after $t_m$, the switch component $S_1$ is active, and the device under test DUT is active as well so as to derive the generated current $I_{dsat}$ flowing through the device under test DUT. As similar in the previous illustrations, in the drawing of FIG. 5, in order to provide a clear view and understanding of the above disclosed descriptions, the Applicants illustrate both the active switch component $S_1$ as well as the active device under test DUT with thicker lines.

Figure 3:
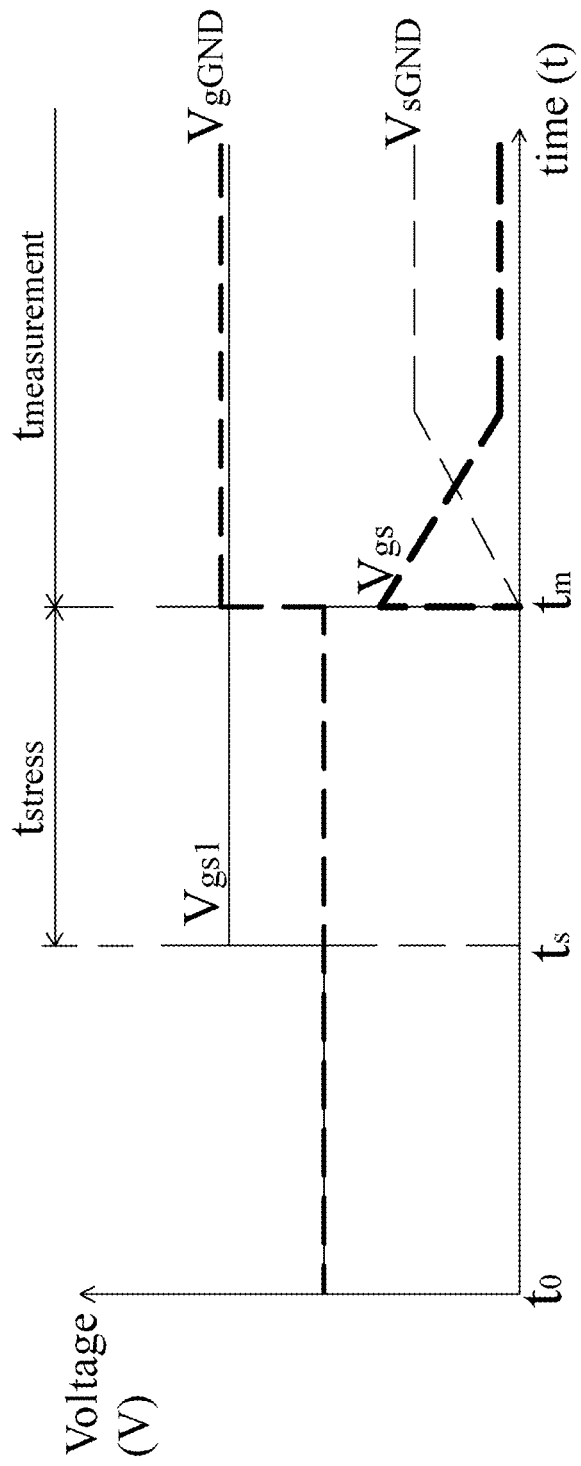
FIG. 3 shows a voltage versus time (V-t) curve diagram of the accompanying signal waveforms of the power device threshold voltage measurement circuit in accordance with the embodiment in FIG. 1 of the present invention.
Figure 4:
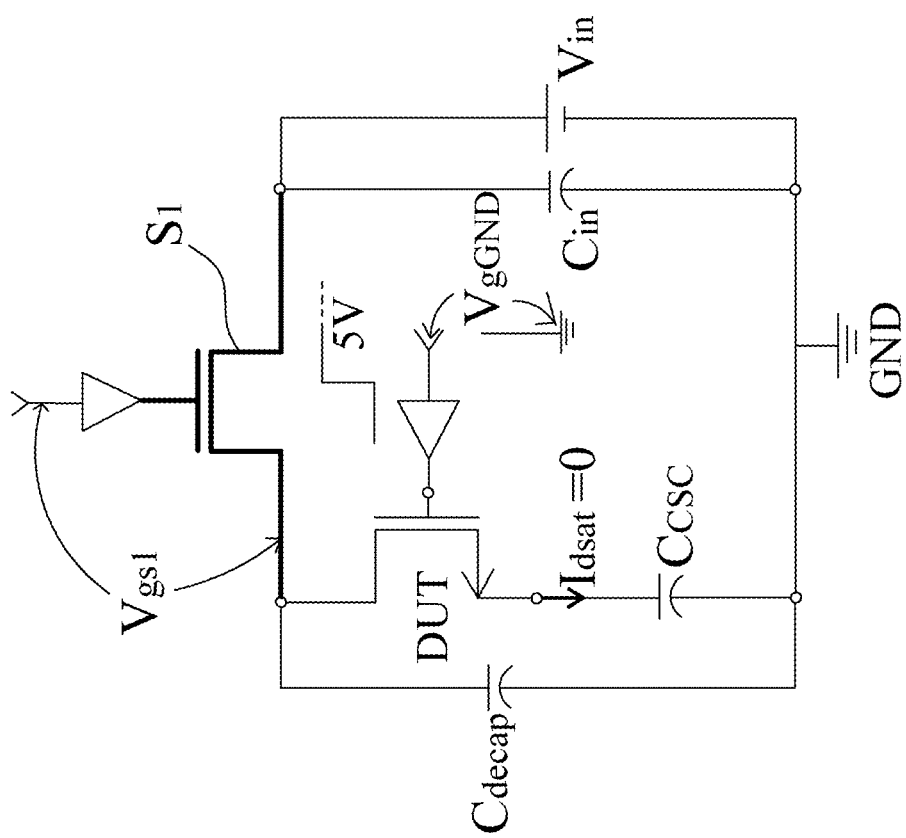
FIG. 4 schematically shows an equivalent circuit diagram during the threshold voltage $V_{th}$ characterization process according to the embodiment of the present invention when in an OFF-state stress mode $t_{stress}$ in between the time interval $t_s \sim t_m$.

According to the embodiment of the present invention, as the current $I_{dsat}$ flowing through the device under test DUT is generated, a voltage across the third terminal of the device under test DUT and the ground GND is increased (see FIG. 3, $V_{sGND}$ is increased). And the increase in $V_{sGND}$ effectively reduces the voltage across the second terminal and the third terminal of the device under test DUT, which is the $V_{gs}$ signal across the device under test DUT. As can be seen in FIG. 3, the $V_{gs}$ signal is reduced. And as a result, it is believed that such operation may accordingly cause further decreases in the DUT current ($I_{dsat}$), representing that the current $I_{dsat}$ flowing through the device under test DUT will be gradually decreased. And as the current $I_{dsat}$ flowing through the device under test DUT reaches a threshold current ($I_{th}$), it is derived by the present invention, that the voltage across the second terminal and the third terminal of the device under test DUT is determined as the threshold voltage of the device under test DUT. As a result, it is verified that by employing the operation method of the present invention as introduced hereinafter, the $V_{gs}$ is determined as the $V_{th}$ value of the device under test DUT. And therefore, it is believed that the power device threshold voltage measurement circuit and its operation method disclosed in the present invention successfully achieves in measuring the gate threshold voltage of the device under test DUT on account of the OFF-state stress and switching transient current for group III-N based devices in high-frequency applications.

Figure 6:
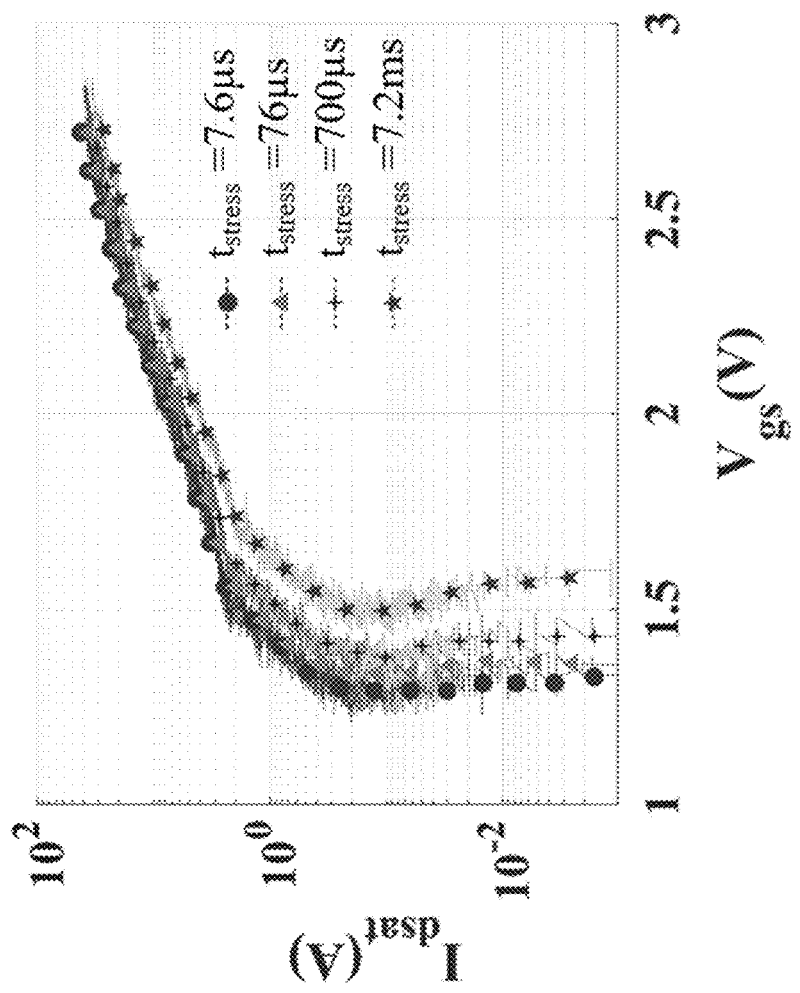
FIG. 6 schematically shows a transfer characteristic curve of $I_{dsat}$ versus $V_{gs}$ by employing the measurement circuit and operation method in accordance with the embodiment of the present invention.

Furthermore, please proceed to refer to FIG. 6, which schematically shows a transfer characteristic curve of $I_{dsat}$ versus $V_{gs}$ by employing the measurement circuit and operation method in accordance with the embodiment of the present invention. As can be seen in the FIG. 6 curve, the transfer characteristic curve $I_{dsat}$ versus $V_{gs}$ of the device under test DUT is plotted. And it is observed that from FIG. 6, the gate threshold voltage $V_{th}$ of the device under test DUT shift as trapping (OFF-state and hot electron) is found to be 1.32V, 1.36V, 1.42V and 1.6V for $t_{stress}$=7.6 µs (plotted in circle symbols), $t_{stress}$=76 µs (plotted in triangle symbols), $t_{stress}$=700 µs (plotted in cross symbols), and $t_{stress}$=7.2 ms (plotted in star symbols), respectively, at the threshold current $I_{th}$ equals to 2 mA. On the other hand, in order to investigate the detrapping time constant, the $V_{gs}$ voltage can be further measured for a sufficiently long period of time. And from the measurement result, it is observed that the longer $t_{stress}$ time may lead to a higher $V_{gs}$ voltage. Such result is mainly caused due to electrons finding more time to get inside the trap. This increases the trapped electron density, which leads to a higher $V_{gs}$ voltage compared with lesser $t_{stress}$ time. And the aforementioned operation method can be repeated for different operating conditions so as to derive the shift in $V_{gs}$ voltage. As a result, by employing the present invention, it is confirmed that the $t_{stress}$ time also impacts the detrapping rate of the electron. The $V_{gs}$ voltage shifts due to $t_{stress}$ (7.6 µs, 76 µs, 700 µs, and 7.2 ms) are (1.385, 1.39, 1.42, and 1.48 V), respectively, whereas, for the $t_{stress}$ time equals to 71.25 ms and 712.2 ms, respectively, the initial $V_{gs}$ shift is only (1.55 and 1.56 V), respectively. This means after 71.25 ms of the stress time $t_{stress}$, the net trapping phenomena almost vanishes. Therefore, 71.25 ms is a trapping time constant. As a result, it is believed that one further objective of the present invention is also achieved by proposing a characterization circuit to measure the $V_{th}$ shift instability. By adopting the circuit diagram as disclosed in the present invention and by performing the disclosed operation method thereof the measurement circuit, a commercial p-GaN based EPC2014 C device is believed to be successfully characterized. From the obtained results, it is observed that the shift in $V_{th}$ is 1.32 V, 1.36 V, 1.42 V, and 1.6 V at the stress time $t_{stress}$ equals to 7.6 µs, 76 µs, 700 µs, and 7.2 ms, respectively, and trapping and larger detrapping time constants are ~71.25 ms and 2.3 s, respectively.

The alternative variations and embodiments may also be made by people who are skilled in the art and having ordinary skills of the art. And yet, the present invention still covers the modifications and its equality based on the disclosed technical contents of the present invention.

As a result, to sum up, according to the technical contents of the present invention, the Applicants of the present invention provide a plurality of feasible embodiments in the above-mentioned paragraphs for implementing the inventive effect of the invention for your references. It is apparent that, compared to the conventional prior arts, the present invention is characterized by providing a novel power device threshold voltage measurement circuit and its operation method thereof. As can be seen from the plurality of embodiments, it is obvious that this invention offers a low-cost circuit capable of measuring a threshold voltage of a power device. In addition, a much shorter pulse width, faster measuring speed and inexpensive measuring equipment are accomplished by using this invention. Moreover, the threshold voltage $V_{th}$ shift due to the OFF-state stress and switching transient current are achieved as well. Thereby, it is believed that the present invention can be effectively applied for group III-N based devices in high-frequency applications.

Among all, the Applicants of the present invention have disclosed a plurality of applicable embodiments, which are advantageous of having extraordinary layout flexibility and can be composed of a variety of layout designs. Accordingly, in view of the technical contents and manners disclosed in the present invention without departing from the spirits of the present invention, it is believed that those skilled in the art and having general knowledge are able to make appropriate modifications or variations based on necessary circuit layout requirements, and the present invention is not restricted by the certain limited configurations and/or circuit diagrams as disclosed in the embodiments of the present invention. As a result, either the modifications or the variations should still fall into the scope of the present invention, and the present invention covers the modifications and its equality.

More specifically, according to the technical characteristics of the present invention which have been provided by the Applicants as illustrated in the previous paragraphs, it is obvious that the disclosed technical solution of the present invention is effective. As can be seen from the embodiments, it, in view of all, should be apparent and obvious that the present invention is not only novel and inventive but also believed to be advantageous of solving and avoiding the conventional issues existing in the prior arts.

As a result, when compared to the prior arts, it is ensured that the present invention apparently shows much more effective performances than before. In addition, it is believed that the present invention is instinct, effective and highly competitive for IC technology and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A power device threshold voltage measurement circuit, comprising:
    a switch component, having a first terminal for receiving an input voltage, a second terminal for receiving a first driving voltage, and a third terminal;
    a device under test, having a first terminal which is being electrically connected to the third terminal of the switch component, a second terminal for receiving a second driving voltage and a third terminal;
    a common source capacitor, being electrically connected in series with the device under test, and the common source capacitor being electrically connected between the third terminal of the device under test and a ground; and a decoupling capacitor, being electrically connected in parallel with the device under test and the common source capacitor, and the decoupling capacitor being electrically connected between the first terminal of the device under test and the ground.

2. The power device threshold voltage measurement circuit according to claim 1, wherein the device under test is a power device, and the power device is fabricated in using Group III-N based semiconductor materials.

3. The power device threshold voltage measurement circuit according to claim 1, wherein the switch component is a power switch, the second terminal of the power switch is further connected with a gate driver for receiving the first driving voltage such that the first driving voltage is a gate driving voltage of the power switch.

4. The power device threshold voltage measurement circuit according to claim 2, wherein the device under test is a Group III-N based switching device, the second terminal of the device under test is further connected with a gate driver for receiving the second driving voltage such that the second driving voltage is a gate driving voltage of the Group III-N based switching device.

5. The power device threshold voltage measurement circuit according to claim 1, wherein the first terminal of the switch component is further connected with an input capacitor, and the input capacitor is electrically connected between the first terminal of the switch component and the ground.

6. The power device threshold voltage measurement circuit according to claim 1, further comprising a differential amplifier, wherein the differential amplifier is electrically connected between the second terminal and the third terminal of the device under test.

7. The power device threshold voltage measurement circuit according to claim 1, wherein when the power device threshold voltage measurement circuit is operated, an OFF-state stress mode and a measurement mode are successively applied to the power device threshold voltage measurement circuit for measuring a threshold voltage of the device under test.

8. The power device threshold voltage measurement circuit according to claim 7, wherein before the OFF-state stress mode, the switch component and the device under test are kept off by applying a zero voltage across the second terminal and the third terminal of the switch component and across the second terminal and the third terminal of the device under test.

9. The power device threshold voltage measurement circuit according to claim 7, wherein in the OFF-state stress mode, a high-level voltage is provided across the second terminal and the third terminal of the switch component, and the second driving voltage provided to the device under test is zero, such that a current flowing through the device under test ($I_{dsat}$) is zero.

10. The power device threshold voltage measurement circuit according to claim 7, wherein in the measurement mode, a high-level voltage is provided both across the second terminal and the third terminal of the switch component and to the second driving voltage for inputting to the device under test, such that a current flowing through the device under test ($I_{dsat}$) is generated.

11. The power device threshold voltage measurement circuit according to claim 10, wherein as the current flowing through the device under test ($I_{dsat}$) is generated, a voltage across the third terminal of the device under test and the ground is increased, which accordingly reduces a voltage across the second terminal and the third terminal of the device under test such that the current flowing through the device under test ($I_{dsat}$) is further decreased.

12. The power device threshold voltage measurement circuit according to claim 11, wherein when the current flowing through the device under test ($I_{dsat}$) reaches a threshold current ($I_{th}$), the voltage across the second terminal and the third terminal of the device under test is determined as the threshold voltage of the device under test.

13. An operation method of a power device threshold voltage measurement circuit, wherein the power device threshold voltage measurement circuit includes a switch component, a device under test, a common source capacitor and a decoupling capacitor, the switch component includes a first terminal for receiving an input voltage, a second terminal for receiving a first driving voltage and a third terminal, the device under test includes a first terminal which is being electrically to the third terminal of the switch component, a second terminal for receiving a second driving voltage and a third terminal, the common source capacitor is electrically connected in series with the device under test and electrically connected between the third terminal of the device under test and a ground, and the decoupling capacitor is electrically connected in parallel with the device under test and the common source capacitor and electrically connected between the first terminal of the device under test and the ground, the operation method of the power device threshold voltage measurement circuit comprising:
  applying an OFF-state stress mode, in which a high-level voltage is provided across the second terminal and the third terminal of the switch component, and the second driving voltage provided to the device under test is zero; and
  applying a measurement mode which is successively after the OFF-state stress mode, wherein in the measurement mode, a high-level voltage is provided both across the second terminal and the third terminal of the switch component and to the second driving voltage for inputting to the device under test, so as to measure a threshold voltage of the device under test.

14. The operation method of the power device threshold voltage measurement circuit according to claim 13, wherein before the OFF-state stress mode, the switch component and the device under test are kept off by applying a zero voltage across the second terminal and the third terminal of the switch component and across the second terminal and the third terminal of the device under test.

15. The operation method of the power device threshold voltage measurement circuit according to claim 13, wherein when in the OFF-state stress mode, a current flowing through the device under test ($I_{dsat}$) is zero.

16. The operation method of the power device threshold voltage measurement circuit according to claim 13, wherein when in the measurement mode, a current flowing through the device under test ($I_{dsat}$) is generated.

17. The operation method of the power device threshold voltage measurement circuit according to claim 16, wherein as the current flowing through the device under test ($I_{dsat}$) is generated, a voltage across the third terminal of the device under test and the ground is increased, and a voltage across the second terminal and the third terminal of the device under test is reduced such that the current flowing through the device under test ($I_{dsat}$) is gradually decreased.

18. The operation method of the power device threshold voltage measurement circuit according to claim 17, wherein when the current flowing through the device under test ($I_{dsat}$) reaches a threshold current ($I_{th}$), the voltage across the second terminal and the third terminal of the device under test is determined as the threshold voltage of the device under test.

19. The operation method of the power device threshold voltage measurement circuit according to claim 13, wherein the device under test is a power device, and the power device is fabricated in using Group III-N based semiconductor materials.

20. The operation method of the power device threshold voltage measurement circuit according to claim 18, wherein a differential amplifier is further electrically connected between the second terminal and the third terminal of the device under test so as to measure the voltage across the second terminal and the third terminal of the device under test as the threshold voltage of the device under test.

* * * * *